E. C. AULD AND J. R. CAMPBELL.
METHOD OF TREATING AND RECOVERING BY-PRODUCTS FROM ACID MINE WATER.
APPLICATION FILED MAY 8, 1916. RENEWED APR. 16, 1919.
1,310,384.
Patented July 15, 1919.
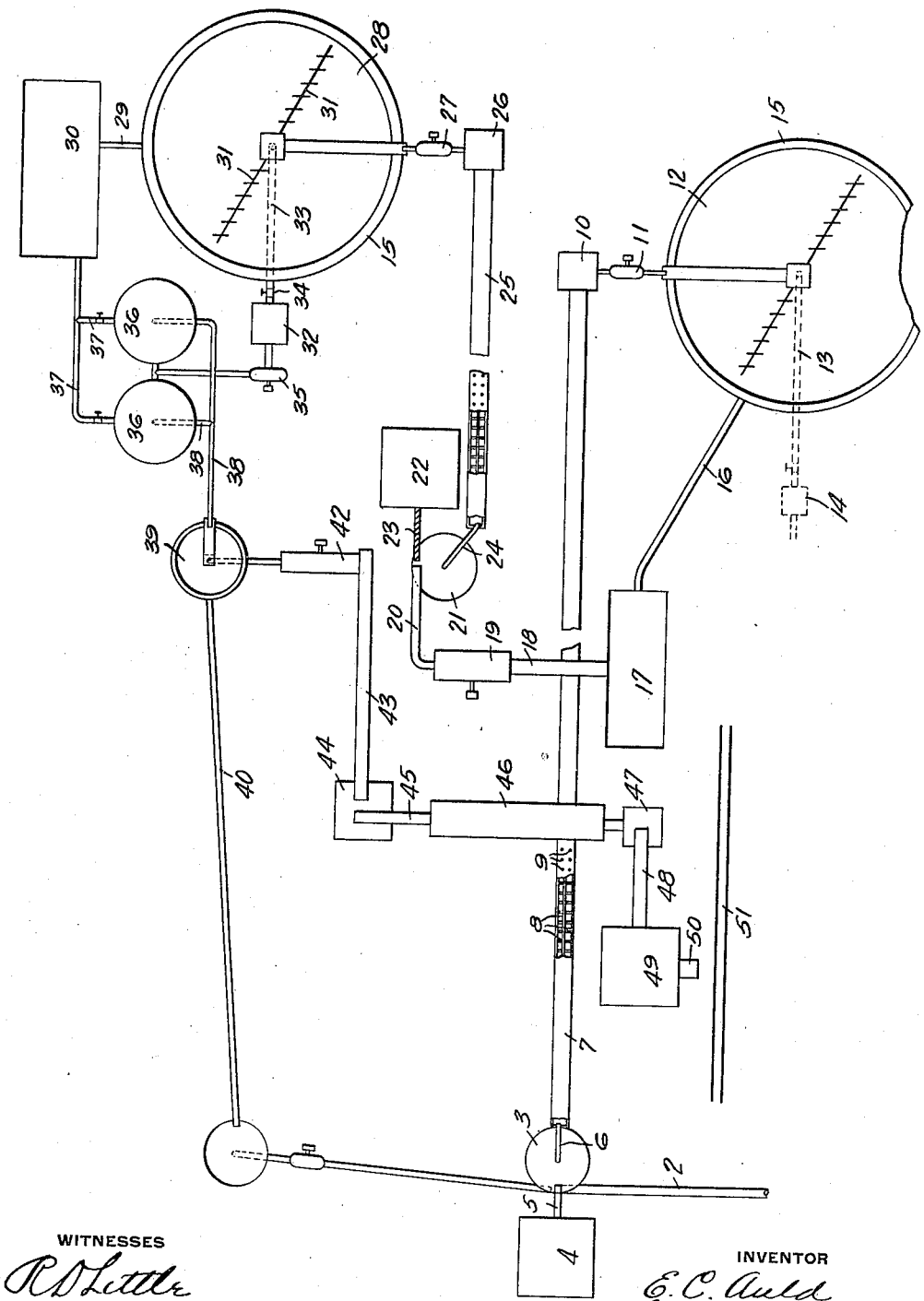
WITNESSES
INVENTOR

UNITED STATES PATENT OFFICE.

ELGIE C. AULD AND JAMES R. CAMPBELL, OF SCOTTDALE, PENNSYLVANIA.

METHOD OF TREATING AND RECOVERING BY-PRODUCTS FROM ACID MINE-WATER.

1,310,384. Specification of Letters Patent. Patented July 15, 1919.

Application filed May 8, 1916, Serial No. 96,231. Renewed April 16, 1919. Serial No. 290,606.

*To all whom it may concern:*

Be it known that we, ELGIE C. AULD and JAMES R. CAMPBELL, citizens of the United States, and residents of Scottdale, in the county of Westmoreland and State of Pennsylvania, have invented certain new and useful Improvements in Methods of Treating and Recovering By-Products from Acid Mine-Water, of which the following is a specification.

Our invention relates to the treatment of acid waste water from mines and the recovery of by-products therefrom, and more particularly the drainage water from coal mines.

One object of the invention is to provide a novel method of treating the acid mine water wherein the water is neutralized and softened and whereby the mineral salts in the softened mine water are recovered and prepared for use as a white paint pigment.

Another object of our invention is to provide a novel method of treating the acid drainage water from coal mines wherein the acid water is neutralized, softened and purified and rendered usable in steam boilers and similar industrial purposes, and whereby the mineral salts in the softened water are precipitated and separated from the water and are dehydrated in preparation for use as a white paint pigment.

A still further object of our invention is to provide a novel method of treating mine water and recovering the by-products therefrom as a paint pigment wherein the calcium carbonate, magnesium carbonate and barium sulfate are separated in producing the pigment.

The drawing forming part of this specification is a diagrammatic plan showing one combination and relative arrangement of apparatus adapted for use in carrying out our invention.

In the accompanying drawing the numeral 2 designates a trough or conduit formed of terra cotta or similar acid proof material in which the raw drainage water from a mine or series of mines is delivered into the treating tank or well 3 in which the limestone or other neutralizing agent used is mixed with the acid water. Alongside the well 3 is a bin or hopper 4 having a feed mechanism 5 by which regulable amounts of ground limestone or other comminuted calcareous material is fed into a well 3 and mixed with the inflowing water.

Preferably the limestone or calcareous material is pulverized or ground to such degree of fineness that 85 per cent. will pass through a 200 mesh sieve, as by using the pulverized material a much larger surface area of the material contacts with the water, and the neutralizing operation is thereby greatly facilitated.

The conduit 2 is arranged to discharge tangentially into the well or tank 3 so as to impart a swirling motion to the water within the well which assists in intimately mixing the calcareous material and the inflowing water.

The drainage water from mines in the Connellsville coal region has a total apparent acidity averaging approximately 200 grains per U. S. gallon of which from 10 to 20 per cent. is free sulfuric acid ($H_2SO_4$) or from 20 to 40 grains free acid per U. S. gallon. The total acidity and the percentage of free acid will vary in the drainage water from mines in different localities as will be readily understood.

In round numbers, one pound of pulverized or comminuted limestone, when the limestone is substantially pure, is required to neutralize each pound of free sulfuric acid in the water, and the iron salts, being held in solution and in suspension by the free acid, will be precipitated as a ferric sulfate and ferric hydrate, after neutralizing and aerating the mine water. As about one-third of the sulfuric anhydrid ($SO_3$) in the iron sulfate must be broken down to secure good precipitation and coagulation of the hydrated oxid the use of somewhat more than the theoretical amount of limestone or other calcareous material will be found desirable in practising our invention.

The average acidity or percentage of free acid in the mine water to be treated will be ascertained and the amount of finely divided limestone or other calcareous material necessary to be added to a given quantity of the water will be determined.

The acid mine water is caused to flow from the conduit 2 into the well 3 and at the same time regulated amounts of the comminuted calcareous material will be fed into the well 3 from the bin or hopper 4 by means of the feed mechanism 5. Enough calcareous material will be introduced into the water to neutralize the free sulfuric acid and start or cause incipient precipitation, care being taken to regulate the quantity of neutralizing agent mixed with the water so as to prevent the addition of an excess of calcareous material sufficient to cause the precipitation of calcium sulfate when the precipitate is to be used as a gas purifier.

When the precipitate is intended for use as a fertilizer calcareous material will be added in excess of the amount necessary to neutralize the water so as to cause the precipitation of calcium sulfate.

The treated mine water is then removed from the well 3 by means of a submerged siphon 6 which discharges into one end of a long flume 7. This flume, which ordinarily will be several hundred feet in length, is provided at short intervals in its length with baffles 8, air also being drawn into the flume through the openings 9 in the top of the flume, the baffles and incoming air operating to agitate and aerate the stream of water flowing through the flume in causing precipitation of the iron compounds in the neutralized water. When found necessary or desirable air under pressure will be introduced into the flume 7 and also into the well 3 to further aerate and agitate the water.

The water is discharged from the flume 7 into a sump 10 and a pump 11 connected to the outlet on the sump is employed to deliver the water from the sump into a thickener 12 (a "Dorr" thickener ordinarily being used). In passing through the thickener precipitation of the iron compounds is completed and the sludge or precipitate is separated from the body of water, being removed from the bottom of the thickener from time to time through a conduit or tunnel 13 to a sump or well 14. The so-formed precipitate is afterward removed from the sump 14 and dried, calcined or otherwise treated in preparation for use as a fertilizer and as a gas purifying sponge in the purification of producer or artificial gas or otherwise, this later treatment of the precipitate depending upon the use to which it is afterward put.

The water remains in the thickener for about one hour or until the sludge is precipitated and the water on top becomes clear, the clarified water overflowing into the annular trough 15 encircling the top of the thickener into the trough or conduit 16.

The mine water when treated and separated from the precipitate in the manner which has been described, is essentially a sulfate water having a degree of hardness which requires softening before being usable in steam boilers and for similar industrial purposes, the neutralized water carrying approximately 100 grains of sulfate hardness per U. S. gallon.

The neutralized mine water as separated from the sludge or precipitated in the thickener 12 overflows from the trough 15 into the trough 16 and is led thereby into a cistern or storage basin 17. In treating the mine water in accordance with this invention the neutralized water passes from the storage basin 17 through the conduit 18 into a mechanical sand filter 19 to remove any remaining traces of iron precipitate in the water, after its separation from the sludge or precipitate. This filtering step, while not absolutely necessary, is desirable so as to prevent possible discoloration of the white paint pigment recovered as a by-product in treating the softened water in accordance with this invention, and also because a superior product is obtained.

The filtered water is conducted from the filter bed 19 through a suitable conduit 20 into a treating tank or well 21, the discharge end of this conduit being arranged to deliver the filtered sulfate water tangentially into the treating tank 21.

As the water flows into the well 21 commercial barium carbonate ($BaCO_3$), which has been ground or pulverized to pass through a 100 mesh screen and 85 per cent. through a 200 mesh screen, is fed in regulated quantities into the tank from the bin or hopper 22 located alongside the treating tank by means of a suitable feed mechanism 23 such as a screw conveyer.

The barium carbonate mixed with the filtered sulfate water in the treating tank softens the water, the principal reactions being—

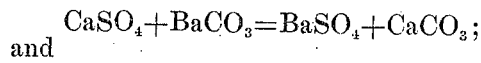

and

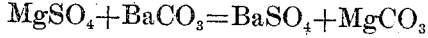

The barium sulfate ($BaSO_4$) and the carbonates of calcium ($CaCO_3$) and magnesium ($MgCO_3$) are insoluble, so that substantially all of the minerals in the filtered water will become precipitated and will be recovered in the precipitate or sludge settling in the tank 21.

The precipitate or sludge is removed from the bottom of the treating well 21 by means of a submerged siphon 24 which extends downwardly within the well with its inlet end closely adjacent to the well bottom, and which discharges from the well at a level below the top of the water in the well into one end of a long flume 25. This flume, like the one which has been described in connection with the neutralizing operation, is provided with a series of baffles 8 and air inlets 9 so as to violently agitate the water in its passage through the flume and assist in the coagulation and precipitation of the sludge. When desired an agitator such as a "Dorr" agitator may be employed instead of the flume 26 for agitating the water.

The water is discharged from the flume 25 into a sump 26 from which it is removed by the pump 27 and is delivered to a Dorr thickener 28 of suitable capacity.

The coagulated water remains in the thickener 28 for a sufficient time interval to give an overflow which is substantially free from precipitate or sludge. The water as it clarifies overflows into the annular trough 15 on the periphery of the thickener 28 and is delivered by the conduit or trough 29 into a suitable reservoir or basin 30 in which it is stored in readiness for use in any ordinary industrial purposes. If required for domestic use further treatment of the water probably will be necessary, and in cases where there is no demand for the softened filtered water, being substantially pure it may be allowed to discharge into adjacent streams without polluting the streams and without objection by the Federal authorities.

The precipitate or sludge will collect on the bottom of the thickener 28, being allowed to build up on the bottom until well thickened, and being gradually worked to the sludge outlet in the bottom of the thickener by means of the slowly rotating arms or scrapers 31 within the thickener. An alarm system may be used when desired or found necessary to show the presence or extent of stress on the revolving arms 31 and in this way indicate the amount of sludge collected on the bottom of the thickener.

The thickened sludge is conveyed from the thickener into the small sludge cistern 32 through the pipe or conduit 33 connecting the cistern with the outlet on the thickener and a valve 34 is provided on the conduit so as to regulate the flow of sludge from the thickener and enable the flow to be either intermittent or continuous as desired.

The thickened sludge is then transferred from the cistern 32 by a centrifugal pump 35 into settling tanks 36, 36, in which sedimentation is completed and the supernatant water removed from the precipitate or sludge. The clarified water in the settling tanks 36 is drained into the storage basin or reservoir 30 through valved pipes 37.

The sludge collected in the bottom of the settling tanks 36 is then conveyed, preferably by gravity, through suitable pipes or conduits 38 to a classifier 39 in which the carbonates of calcium and megnesium are separated from the sulfates in the precipitate or sludge. The carbonates are then transferred by gravity from the classifier 39 through a trough 40 into a tank or well 41 and stored, and the sulfates are transferred from the classifier 39 to a filter wheel, filter press or similar apparatus 42 in which they are further dehydrated.

The dehydrated sulfates are then discharged from the filter wheel 42 upon a conveyer 43 which in turn discharges the material into the pit 44, and the elevator 45 in this pit transfers the materials into the oven or kiln 46 in which the sulfates are completely dried by the application of direct heat. The dried materials are discharged from the oven or kiln 46 into a pit 47 and the elevator 48 in this pit conveys and delivers the materials into the overhead bin or hopper 49 in which they are stored. The discharge outlet of the bin is provided with a chute 50 by which the materials are discharged into a car positioned on the railway track 51 alongside the bin or hopper 49.

The carbonates may, and ordinarily will, be transferred as required by means of the pumps 52 and conduit 53 into the neutralizing tank or well 3 and used therein as a neutralizing agent in treating the raw acid mine water.

In some cases the use of the classifier 39 will be dispensed with and the separation of the carbonates and sulfates will be omitted, in which case the carbonates will form an integral part of the resulting white paint pigment obtained as a by-product in carrying out our invention, which in such case will be of a lower grade.

The advantages of our invention will be apparent to those skilled in the art. By treating the acid drainage water from mines as has been described the water is neutralized and the precipitate obtained in neutralizing the raw mine water is separated from the water, and when dried is in condition for further treatment in making fertilizers and gas purifiers.

The precipitate or sediment recovered in softening the neutralized water forms a good white paint pigment when dried, and by separating the carbonates from the sulfates in this precipitate, a superior white paint pigment is obtained which can be used in competition with lead pigments, while the carbonates of calcium and magnesium are separately recovered and may be again used as a neutralizing agent in neutralizing acid mine water.

The neutralized water is softened and purified so that there is no objection to its being discharged into adjacent streams and it is also put into condition for use in making steam and like industrial purposes. By further purification the water may be rendered usable for domestic purposes.

Modifications in the construction and arrangement of the apparatus used in practising our invention may be made without departing from the invention specified in the appended claims. The usual known constructions of filter wheels, centrifugal driers, and vacuum driers, may be used in place of the apparatus shown and described. The pumps may be dispensed with and the apparatus arranged to deliver the materials being treated by gravity from one device to the other, and other changes may be made.

We claim:—

1. The method of treating acid mine water and recovering by-products therefrom which consists in adding calcareous material to the acid mine water to neutralize the water and precipitate the resulting sludge, regulating the addition of calcareous material to prevent the precipitation of calcium sulfate, separating the sludge from the neutralized water, filtering the water to remove remaining traces of the precipitate, adding comminuted barium carbonate to the filtered water to soften the water and precipitate the sludge, separating the softened water from the precipitate, and then drying the precipitate to thereby form a white paint pigment.

2. The method of treating acid mine water and recovering by-products therefrom which consists in adding regulated amounts of calcareous material to the acid mine water to neutralize the water and precipitate the resulting sludge, separating the sludge from the neutralized water and filtering the water to remove remaining traces of the precipitate, adding comminuted barium carbonate to the filtered water to soften the water, precipitating the sludge and separating the softened water from the precipitate, separating the barium sulfate from the mixed carbonates in the precipitate by gravitation, and then drying the barium sulfate to thereby form a white paint pigment.

3. The method of treating acid mine water and recovering by-products therefrom which consists in adding calcareous material to the acid mine water to neutralize the water and precipitate the resulting sludge, separating the sludge from the neutralized water, adding barium carbonate to the neutralized water to soften the water, precipitating the sludge and separating the softened water from the precipitate, and then drying the precipitate to thereby form a white paint pigment.

4. The method of treating acid mine water and recovering by-products therefrom which consists in neutralizing the raw mine water by additions of comminuted calcareous material, controlling the quantity of calcareous material added to the water to regulate the precipitation of calcium sulfate, agitating and aerating the mixture to oxidize the iron salts and assist in the precipitation of the iron compounds, precipitating and separating the precipitated iron salts from the body of neutralized water, filtering the water to remove remaining traces of iron salts, softening the filtered water by additions of comminuted barium carbonate, agitating the mixture, separating the precipitate from the softened water, and drying the precipitate to thereby obtain a white paint pigment.

5. The method of treating acid mine-water which consists in neutralizing the mine-water, precipitating and separating the resulting sludge from the body of neutralized water, softening the separated water by additions of barium carbonate and thereby forming a second precipitate, separating the precipitate from the body of softened water and drying the precipitate.

6. The method of treating acid mine-water, which consists in neutralizing the mine-water by additions of calcareous material and precipitating the resulting sludge, separating the body of neutralized water from the precipitated sludge, softening the separated water by additions of barium carbonate and precipitating the resulting sludge and then separating the precipitate from the body of softened water.

In testimony whereof we have hereunto set our hands.

ELGIE C. AULD.
JAMES R. CAMPBELL.

Copies of this patent may be obtained for five cents each, by addressing the "Commissioner of Patents, Washington, D. C."